United States Patent
Fan et al.

(10) Patent No.: US 9,163,666 B2
(45) Date of Patent: Oct. 20, 2015

(54) AXIAL PASSIVE MAGNET BEARING SYSTEM

(75) Inventors: Yi-Hua Fan, Tao-Yuan (TW);
Ying-Tsun Lee, Tao-Yuan (TW);
Chung-Chun Wang, Tao-Yuan (TW);
Yi-Lin Liao, Tao-Yuan (TW)

(73) Assignee: CHUNG YUAN CHRISTIAN UNIVERSITY, Tao-Yuan (TW)

( * ) Notice: Subject to any disclaimer, the term of this patent is extended or adjusted under 35 U.S.C. 154(b) by 353 days.

(21) Appl. No.: 13/524,190

(22) Filed: Jun. 15, 2012

(65) Prior Publication Data

US 2013/0293049 A1 Nov. 7, 2013

(30) Foreign Application Priority Data

May 4, 2012 (TW) .............................. 101116076 A

(51) Int. Cl.
*H02K 7/09* (2006.01)
*F16C 32/04* (2006.01)

(52) U.S. Cl.
CPC .......... *F16C 32/0402* (2013.01); *F16C 32/0412* (2013.01); *F16C 32/0425* (2013.01); *Y02E 10/725* (2013.01)

(58) Field of Classification Search
CPC ....................................................... H02K 7/09
USPC ................................................. 310/90, 90.5
See application file for complete search history.

(56) References Cited

U.S. PATENT DOCUMENTS

| | | | | |
|---|---|---|---|---|
| 3,934,950 | A * | 1/1976 | Kuhlmann | 310/90.5 |
| 4,652,780 | A * | 3/1987 | Murakami et al. | 310/90.5 |
| 5,640,887 | A * | 6/1997 | Hull et al. | 74/572.11 |
| 5,695,471 | A * | 12/1997 | Wampler | 604/131 |
| 5,789,837 | A * | 8/1998 | Shin et al. | 310/90.5 |
| 6,350,109 | B1 * | 2/2002 | Brunet et al. | 417/365 |
| 6,794,776 | B1 * | 9/2004 | Gabrys | 310/74 |
| 2003/0042812 | A1 * | 3/2003 | Post | 310/90.5 |
| 2004/0070299 | A1 * | 4/2004 | Cyr | 310/90.5 |
| 2008/0309184 | A1 * | 12/2008 | Eilers et al. | 310/90.5 |
| 2010/0244786 | A1 * | 9/2010 | Gruendl et al. | 322/4 |
| 2011/0123358 | A1 * | 5/2011 | Englaender | 417/66 |

OTHER PUBLICATIONS

Fan et, al., "Passive Magnetic Bearing Design for a Small Wind Generator System", 2011, ICETI.

* cited by examiner

*Primary Examiner* — Naishadh Desai
(74) *Attorney, Agent, or Firm* — WPAT, PC; Justin King

(57) ABSTRACT

An axial passive magnet bearing system utilizes the frictionless characteristic of non-contact type permanent magnet bearing to minimize the disadvantages induced by frictions. For example, both the energy and material loses of the mechanical bearing. Two permanents magnet are made of permanent magnet materials and positioned over two opposite surfaces of two mechanical structures, where mechanical bearing(s) is located therebetween. Hence, the magnetic force between the two magnets can improve some disadvantages among the two mechanical structures and the mechanical bearings, such as friction and energy loss.

6 Claims, 7 Drawing Sheets

AXIAL PASSIVE MAGNET BEARING SYSTEM

BACKGROUND OF THE INVENTION

1. Field of the Invention

The present disclosure relates generally to axial passive magnet bearing system, and more particularly to axial passive magnet bearing system capable of reducing axial loading and energy loss induced by friction.

2. Background of the Related Art

The relative motion between different structures of a mechanism is very popular for industry and daily life. The bearing is popularly used to stable and support the action of the rotation axis when one or more of movement and/or rotation are required. For example, the ball bearing, the roller bearing and the needle bearing. Essentially, the bearing provides a rotation support between the rotator and the stator, so that the rotor indirectly contacts with the stator. Hence, the rotation and the movement of the bearing may reduce some disadvantages induced by the relative motion between the rotator and the stator, such as friction, vibration, noise, lose, and so on.

In general, the loss of the bearing is a function of both the rotation and the movement between the bearing and the rotor/stator, i.e., the combination of the rotor and the stator. The higher the rotation rate of the bearing, the larger the dynamical frication loss between the bearing and the rotor/stator. Besides, due to the direct contact between the bearing and the rotor/stator, the static friction coefficient therebetween also is a key factor about how the motion of the bearing is driven by the rotor/stator. The loss of the bearing also is related to the details of the relative motion between the rotor and the stator, where the rotor and the stator are positioned over two opposite sides of the bearings. When the two structures (rotor and/or stator) over opposite sides of the bearing are only rotated around one same axis, the bearing only has to satisfy the requirement of axial motion. In contrast, when the two structures (rotor and/or stator) over opposite sides of the bearing are rotated around the same axis and moved vertically to (radically to) the axis simultaneously, the bearing has to satisfy the requirements of both the axial motion and the radical motion. Clearly, different bearings may be operated under different conditions and have different losses.

Particularly, in a vertical mechanism, two structures (rotor and/or stator) on opposite sides of the bearing are vertically arranged. Hence, the weight of the upper structure, even the weight of other elements positioned on and/or over the upper structure, is supported by the lower structure. In contrast, in a horizontal mechanism, two structures over opposite sides of the bearing are positioned on the same level, and then no more extra weight are supported by the bearing. Significantly, in the vertical mechanism, the disadvantages of the bearing are more serious due to the existence of the weight, no matter friction, loss, vibration, noise and so on.

Accordingly, it is desired to develop a new bearing system for improving these disadvantages of the bearing system used to provide rotation support between two separated structures.

SUMMARY OF THE INVENTION

The invention provides the axial passive magnet bearing system(s) using the non-contact type bearing made of permanent magnet.

One preferred embodiment of this invention is an axial passive magnet bearing system. The system includes at least a first structure and a second structure separated from the first structure, and at least one mechanical bearing mechanically contacted with both structures and positioned therebetween. Further, a third structure and a fourth structure are mechanically connected to the first structure and the second structure respectively, and are further mechanically respectively connected to a first magnet and a second magnet separated from the first magnet. Herein, the first structure, the mechanical bearing and the second structure are positioned in order along an axial direction, also both the first magnet and the second magnet are made of at least one permanent magnet material.

By adjusting the relative positions and the connections between these structures, also by adjusting the magnetic force (attractive force or exclude force) between the two magnets, the force applied on the mechanical bearing may be decreased. Thus, at least the lose and the deformation of the mechanical bearing may be decreased, also the required performance maintenance may be decreased and the useful lifetime of the whole system may be elongated. For example, in a vertical mechanism where the first structure is positioned over the second structure, the combination of the third structure, the fourth structure and the two magnets may allow the magnetic force being opposite to the gravity force applied to both the mechanical bearing and the second structure, so that the net force applied on the mechanical bearing is decreased.

With the advance of material technology, many permanent magnet materials are used in many different commercial products. For example, some candidate materials of the permanent magnet materials include, but not limited to, ferrite magnet, Al—Ni—Co alloy, Sm—Co alloy, Ne—Fe—B alloy, and so on. Hence, each magnet of the axial passive magnet bearing system may be made of commercial permanent magnet material(s), and satisfy the requirements of longer lifetime, higher magnetic flux, better stability, more uniform magnetic field, and so on.

Other preferred embodiments also are axial passive magnet bearing systems. The main characteristic of these embodiment is the usage of the magnetic force between different magnets for decreasing the net force applied to the mechanical bearing positioned between the first structure and the second structure, so as to reduce friction, loss, vibration, noise and so on. For different embodiments, the relative positions and the mechanical connections between the third/fourth structures and the first/second structures may be different, also the relative positions and the mechanical connections between the first/second magnets and the third/fourth structures may be different. Hence, the axial passive magnet bearing system may be flexibly adjusted, and are utilized by different mechanisms.

DETAILED DESCRIPTION OF THE INVENTION

The detailed description of the present invention will be discussed in the following embodiments, which are not intended to limit the scope of the present invention, but can be adapted for other applications. While drawings are illustrated with some details, it is appreciated that the quantity of the disclosed components may be greater or less than that disclosed, except expressly restricting the amount of the components.

Figure 1:
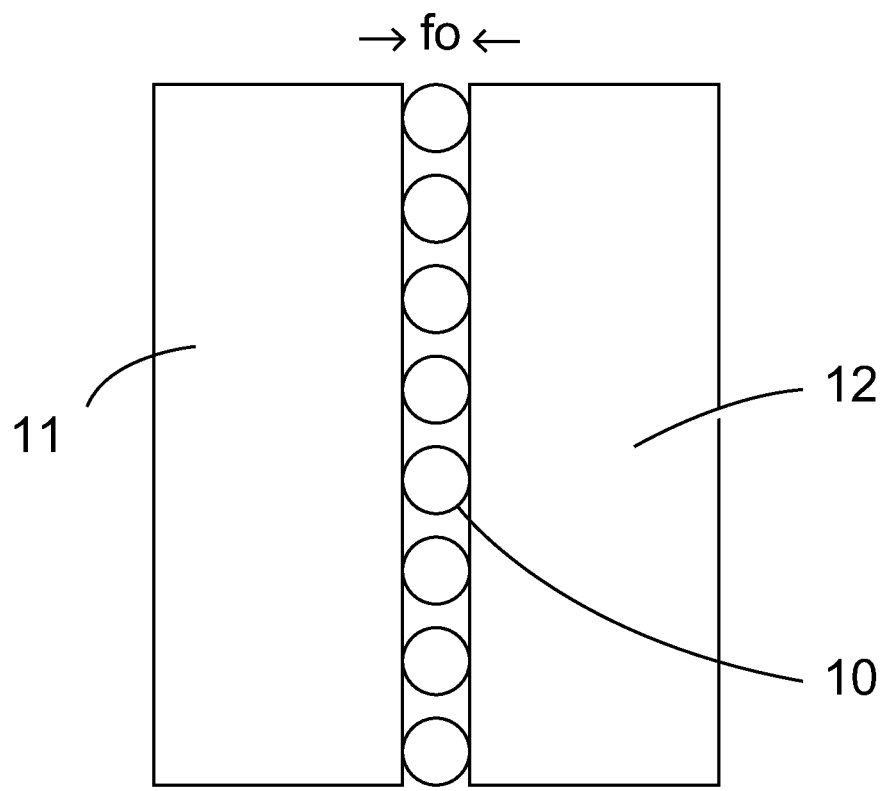
FIG. 1 is a representative cross-section diagram of one mechanical bearing system.

As shown on FIG. 1, for a mechanical bearing system, at least one mechanical bearing 10 is positioned between first structure 11 and second structure 12 along an axial direction, also mechanical bearing 10 mechanically contacts with both structures 11/12 which are separated from each other. Once first structure 11 and second structure 12 has relative motion, such as slide or rotation, mechanical bearing 10 may rotate and/or slide to provide an elastic support between first structure 11 and second structure 12 so as to reduce friction, vibration, noise, loss and so on. Clearly, the larger the contacting force between the two structures 11/12, the more the friction and the loss between the structures 11/12. In contrast, when the contacting force between the two structures 11/12 is decreased, the vibration and the noise may be increased because the two structures 11/12 do not tightly contact with mechanical bearing 10. Hence, as shown on FIG. 1, when the requirement of maximized elastic support and the requirement of minimized friction/loss/vibration/noise are balanced, there is an optimum contacting force Fo between the two structures 11/12 and mechanical bearing 10. The optimum contacting force Fo is decided by the mechanical details of the mechanical bearing system and how the mechanical bearing system is operated. For example, the material and the size of mechanical bearing 10, the dynamical/static frication coefficients between mechanical bearing 10 and the two structures 11/12, the relative rotation rate between the two structures 11/12, and so on.

Figure 2A:
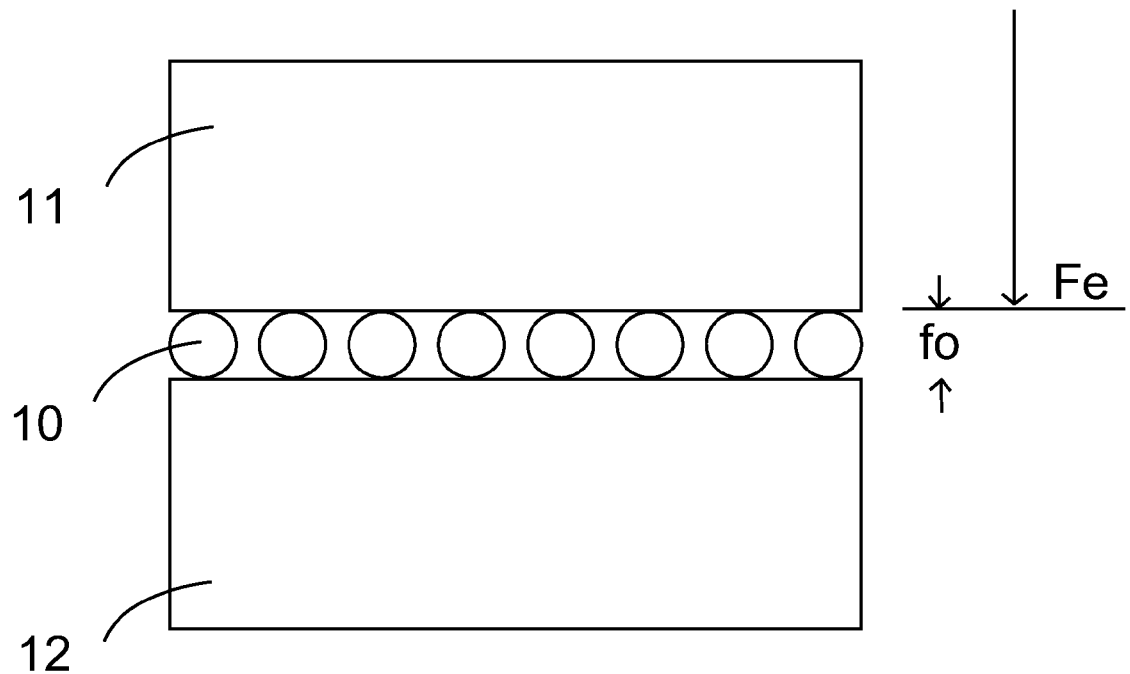
FIG. 2A and FIG. 2B are two representative schematic diagrams where the disadvantages of the well-known technologies and how the invention improves such disadvantages are illustrated respectively.

However, for different mechanisms, even same mechanical bearing system is utilized, the practical contacting force between mechanical bearing 10 and the two structures 11/12 still may be different because different relative relations between the mechanical bearing system and other portions of each mechanism. For example, in a vertical wind generator, the two structures 11/12 are spatially configured along a vertical axis when the mechanical bearing system is used to connect a rotation fan, a rotation axis, a rotor of an electric generator and a fixed base. In such situation, the gravity force, i.e., the weight, of at least the rotation fan and the rotation axis are directly applied to first structure 11, so that he practical contacting force between mechanical bearing and the two structures 11/12 is increased. Therefore, as shown on FIG. 2A, when the mechanical bearing system is used in a practical mechanism, the practical contacting force between mechanical bearing 10 and the two structures 11/12 usually is a sum of the optimum contacting force Fo and an external force Fe, such as the gravity force.

Significantly, the existence of the external force Fe significantly affects the operation of the mechanical bearing system. For example, the friction force applied to the mechanical bearing may be increased, so that more loss and/or deformation may be unavoidable also more energy loss during the relative motion between the two structures may be increased. Some popular solutions of such situation include, but not limited to, more lubrication maintenance, better lubricating oil, usage of wearable material, smooth interface between mechanical bearing and the two structures, and so on. However, all popular solutions have unavoidable disadvantages, such as higher hardware cost, higher maintenance cost, lower throughput decreased by higher maintenance times, and so on.

Figure 2B:
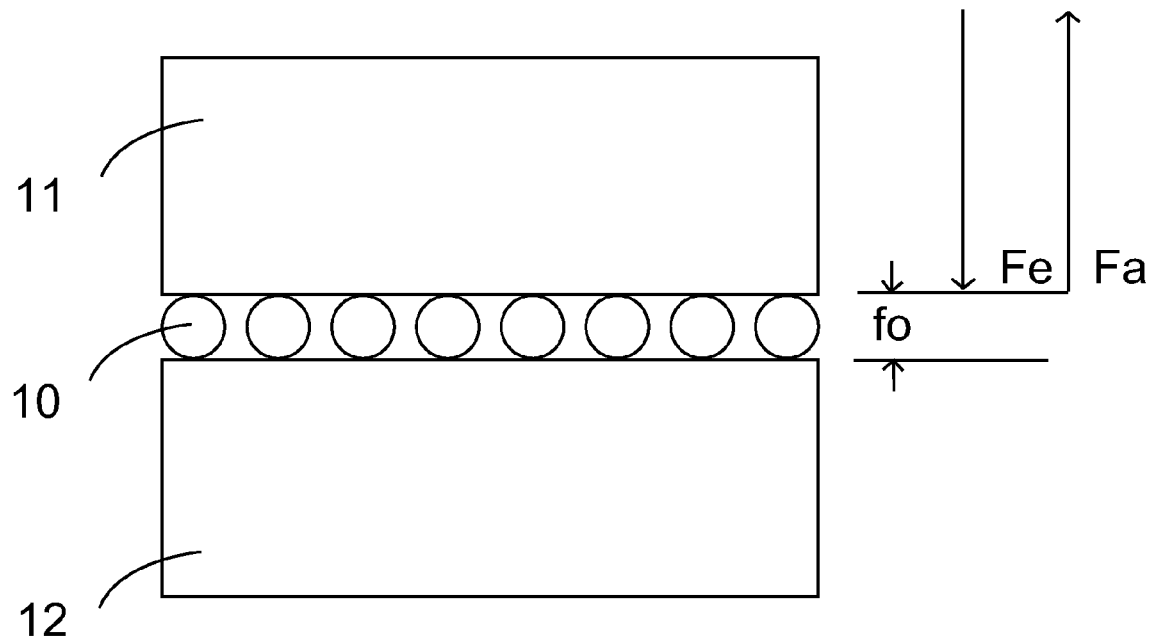

The proposed invention solves the disadvantages induced by the external force Fe by taking a drastic measure to deal with such situation. The external force is almost unavoidable for the practical mechanism, hence, the proposed invention uses an approach to eliminate, at least minimize, the effect of the external force Fe on the practical contacting force between mechanical bearing 10 and the two structures 11/12. As shown on FIG. 2B, the proposed invention applies an extra force Fa to the bearing system, wherein the direction of the extra force Fa is opposite to the direction of the external force Fe. Hence, the difference between the practical contacting force and the optimum contacting force Fo is not Fe, but is the difference between Fe and Fa. In other words, by properly configuring modification device 13 capable of generating Fa, the practical operation situation of the bearing system may be similar to, or even equal to, the optimum situation that the practical contacting force is equal to the optimum contacting force Fo. Moreover, the device capable of providing the extra force Fa is mechanically connected to first structure 11 and second structure 12, thus, extra force Fa may be simply applied to both mechanical bearing 10 and the two structures 11/12 without obviously modifying both mechanical bearing 10 and the two structures 11/12.

In this proposed invention, the extra force Fa is provided by using the magnetic field action (attractive force or exclude force) between two or more magnets made of permanent magnet material(s). The permanent magnet material is very stable and capable of continuously providing a stable magnetic field during a long period, also, many commercial permanent magnet material have been utilized by many different mechanisms. Therefore, modification device 13 made of permanent magnet material can ensure that the practical contacting force is similar to, or even equal to, optimum contacting force Fo during a long period. Hence, the throughput can be not significantly decreased by the requirement of performance maintenance, also the proposed invention can be simply used by any commercial mechanism.

Furthermore, because mechanical bearing 10 slides and/or rotates along the surfaces between first structure 11 and second structure 12, the effect of external force Fe is essentially appeared along the axis where first structure 11, mechanical bearing 10 and second structure 12 are positioned in order along. In short, the proposed invention is essentially focused on the axial direction. Particularly, for a practical mechanism, the amount of the external force Fe usually is fixed or varied during a forecasted range. For example, in the vertical wind generator, Fe is essentially equal to the gravity force (i.e., weight) of both the rotation fan and the rotation axis. Hence, the proposed invention is focused on the utility of permanent magnet(s) with fixed position(s) and fixed range of magnetized strength(es) to minimize the effect of the external force Fe. In other words, the proposed invention is related to the application of a combination of some passive permanent magnets.

One preferred embodiment is an axial passive magnet bearing system. As shown on FIG. 3A, the preferred embodiment includes at least first structure 31, second structure 32, one or more mechanical bearing 33, third structure 34, fourth structure 35, first magnet 36 and second magnet 37. The combination of first structure 31, second structure 32 and mechanical bearing 33 is equal to the well-known mechanical bearing system, hence, the related details are not discussed herein. The combination of third structure 34, fourth structure 35, first magnet 36 and second magnet 37 corresponds to the modification device for providing extra force Fa. Third structure 34 and first structure 31 are mutually mechanically connected but all are separated from second structure 32, also first magnet 36 is mechanically connected to first surface 345 of third structure 34. Hence, the magnetic field action applied to first magnet 36 pushes and/or rotates third structure 34, and then further drives first structure 31. Further, fourth structure 35 is separated from each of first structure 31, second structure 32 and third structure 33, and second magnet 37 is mechanically connected to second surface 355 of fourth structure 35. Also, second magnet 37 is separated from first magnet 36, and second surface 355 faces to first surface 345. Hence, the magnetic field action is generated the by interaction between second magnet 37 and first magnet 36.

Of course, each of first magnet 36 and second magnet 37 are made of permanent magnet materials, such as hard ferrite magnet, Al—Ni—Co alloy, Sm—Co alloy, Ne—Fe—B alloy, any commercial permanent magnet material, any on-developing permanent magnet materials, or any combination thereof. Essentially, to provide the required magnetic exclude force, the proposed invention mainly utilizes some advantages of the permanent magnet materials such as higher residual magnetic flux density, higher coercively, and larger magnetic energy. In addition, to properly shape permanent magnet material(s) and positioned the magnets 36/37 on any hardware close to mechanical bearing 33, it is optional to use any permanent magnet material having the following characteristics: lower thermal expansion coefficient, higher upper limitation of working temperature, and easily to be mechanical processed. Some non-illustrated examples and non-discussed examples of this proposed invention uses the Ne—Fe—B alloy, but different examples of this proposed invention still may use other permanent magnet material, or a combination of some permanent magnet materials, or any processed permanent magnet material(s). For example, stabilized processed permanent magnet material or permanent magnet material with protective layer on the surface.

The magnetic field action between first magnet 36 and second magnet 37 pushes third structure 34 away fourth structure 35, and then applies extra force Fa to first structure 31 via the mechanical connection between third structure 34 and first structure 31. Where, the direction of extra force Fa is opposite to the direction of external force Fe. In this way, the magnetized strengths of the two magnets 36/37 are adjusted to ensure that mechanical bearing 33 may rotate between first structure 31 and second structure 32 without deformation and with less friction and less loss, when external force Fe and extra force Fa is cancelled mutually. For example, in a vertical mechanism where first structure 31 is positioned over second structure 32, the magnetized strengths of first structure 31 and second structure 32 are adjusted to ensure that the magnitude of magnetic exclude force between third structure 34 and fourth structure 35 is equal to the magnitude of gravity force applied by first structure 31 to both mechanical bearing 33 and second structure 32, so that the gravity force applied by first structure 31 is cancelled by the magnetic exclude force between first magnet 36 and second magnet 37.

Surely, to effectively push first structure 31, fourth structure 35 is usually connected to a fixed point of support. Thus, the magnetic field action will not push third structure 34 and fourth structure 35 simultaneously, and then the magnetic field action may be fully transformed into extra force Fa. For example, fourth structure 35 may be fixed onto an outer shall of a mechanism using the proposed axial passive magnet bearing system. For example, in a vertical wind generator, fourth structure 35 may be directed fixed to the ground, i.e., the earth.

The details of both first structure 31 and second structure 32 are not limited but has only requirement that they may behave as the rotor and/or stator of a bearing system. Thus, each of the structures 31/32 may be a plate having one surface contacted with mechanical bearing 32 and an opposite surface connected to other elements of this mechanism. For example, each of the structures 31/32 may be a combination of some parts of the mechanism when the combination of these parts may behave as a rotor or a stator. For example, in a vertical wind generator, first structure 31 may be a combination of the rotation fan, the rotation axis and the rotor of the electric generator, and second structure may be the fixed base. Accordingly, the gravity force applied by first structure 31 to mechanical bearing 33 and second structure 32 is only the gravity force comes from, or through, first structure 31. In other words, the gravity force applied to mechanical bearing 33 and second structure 32 may be the gravity force of first structure 31 itself, also may be the gravity force of any elements positioned over first structure 31.

As discussed above, in this preferred embodiment, first structure 31, mechanical bearing 33 and second structure 32 are positioned along an axial direction in order, also the direction of external force Fe, such as gravity force, will increase the friction between mechanical bearing 33 and the two structures 31/32. Hence, the component of the magnetized direction of first magnet 36 on the axial direction is opposite to the component of the magnetized direction of second magnet 37 on the axial direction. Then, the generated magnetic field action will push third structure 34 away fourth structure 34 so as to separate first structure 31 away second structure 32 and then to decrease, or even eliminate, the effect of external force Fe. When only the variation along the axial direction is considered, i.e., is meaningful, the magnetized direction of first magnet 36 may be vertical to first surface 345 and the magnetic direction of second magnet 37 may be vertical to second surface 355. Optionally, the spatial distribution of first magnet 36 is equal to the spatial distribution of second magnet 37, so that the magnetic field action between the two magnets 36/37 is fully applied along the axial direction. Nevertheless, the preferred embodiment has many variations, wherein the spatial distribution and the magnetized direction/strength of the magnets 36/37 may be varied. The only limitation is to properly provide a magnetic field action for pushing third structure 34 away fourth structure 35.

The mechanical connection between the structures 34/35 and the magnets 36/37 also may be flexibly varied. For example, each of the magnets 36/37 made of permanent magnet material(s) may be fixed in socket, also the permanent magnet material(s) may be mechanically set into metal plate(s). Many other possible variations are not disclosed herein.

Third structure 34 and fourth structure 35 also have many variable details. One key of the invention is the magnetic field action between first magnet 36 and second magnet 37. Then, it is desired to properly adjust these parameters related to the magnetic field distribution between the magnets 36/37. For example, the magnetized directions, the magnetized strengths and relative position of the magnets 36/37. Therefore, each of third structure 34 and fourth structure 35 may be any structure where one of the magnets 36/37 may be positioned. Each of structures 34/35 may have flexibly adjusted position, size, shape, and so on. Many possible variations are not disclosed herein.

The mechanical connection between first structure 31 and third structure 34 also has many flexible variations. The only limitation is to properly delivery the force generated by the magnetic field action between the magnets 36/37 to first structure 31. For example, for the situation shown on FIG. 3A, third structure 34 and first structure 31 even may be different portions of the same structure, where different items 31/34 are used to clearly illustrate only. In other words, as shown on FIG. 3B, shadow portion 38 indicates the situation that third structure 34 and partial first structure 31 is one piece of metal shell. Of course, third structure 34 and first structure 31 also may be separated and connected by the connecting rod or other mechanical parts. Many possible variations are not disclosed herein.

Another preferred embodiment also is an axial passive magnet bearing system. As shown on FIG. 4, it includes at least first structure 41, second structure 42, one or more mechanical bearings 43, third structure 44, first magnet 45 and second magnet 46. Said first structure 41, said first structure 41 as a rotor with a first planar 411. Said second structure 42, said second structure 42 as a stator and said second structure 42 being separated from said first structure 41, wherein said stator with a second planar 421. Said mechanical bearing 43 is positioned between said first planar 411 and said second planar 421, wherein said mechanical bearing 43 mechanically contacts both said first planar 411 and said second planar 421. The combination of first structure 41, second structure 42 and mechanical bearing(s) 43 is similar to the well-known mechanical bearing system, hence, the related details are not limited and then not disclosed herein. The combination of third structure 44, first magnet 45 and second magnet 46 corresponds to the modification device capable of providing extra force Fa. Third structure 44 and first structure 41 are positioned over opposite sides of second structures 42, third structure 44 is separated from second structure 42 but is mechanically connected to first structure 41. First magnet 45 is mechanically connected to third planar 425 of second structure 42, where third planar 425 and mechanical bearing 43 are positioned over opposite sides of second structure 42. Second magnet 46 is mechanically connected to fourth planar 445 of third structure 44 but is separated from first magnet 45, where fourth planar 445 faces third planar 425, wherein said first structure 41, said mechanical bearing 43, said second structure 42 and said third structure 44 are positioned along an axial direction, wherein said first magnet and said second magnet are positioned along the arrangement direction of said first structure, said mechanical bearing and said second structure, wherein said first planar 411, said mechanical bearing 43, said second planar 421, said third planar 425 and said fourth planar 445 are parallel, wherein said first planar 411, said mechanical bearing 43, said second planar 421, said third planar 425 and said fourth planar 445 are vertical to the arrangement direction of said first structure 41, said mechanical bearing 43 and said second structure 42. In addition, each of first magnet 45 and second magnet 46 are made of permanent magnet materials, such as hard ferrite magnet, Al—Ni—Co alloy, Sm—Co alloy, Ne—Fe—B alloy, any commercial permanent magnet material, on-developing permanent magnet materials, or any combination thereof.

Figure 3A:
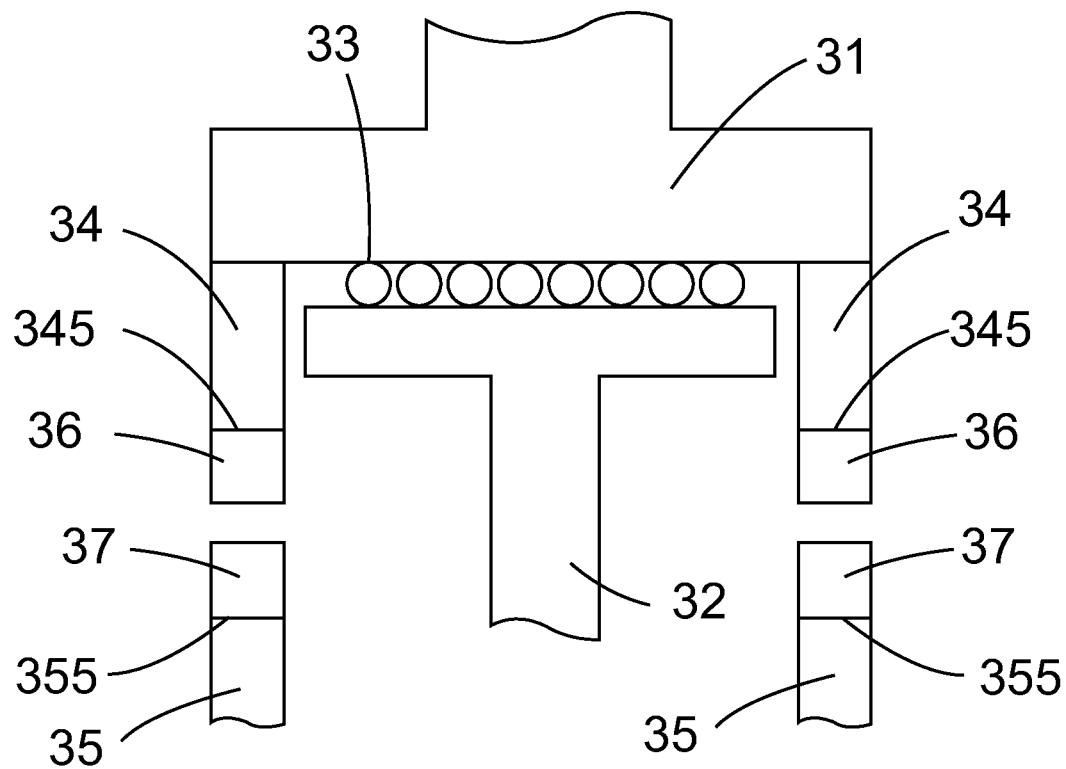
FIG. 3A is a representative cross-section diagram of one preferred embodiments of this invention.
Figure 3B:
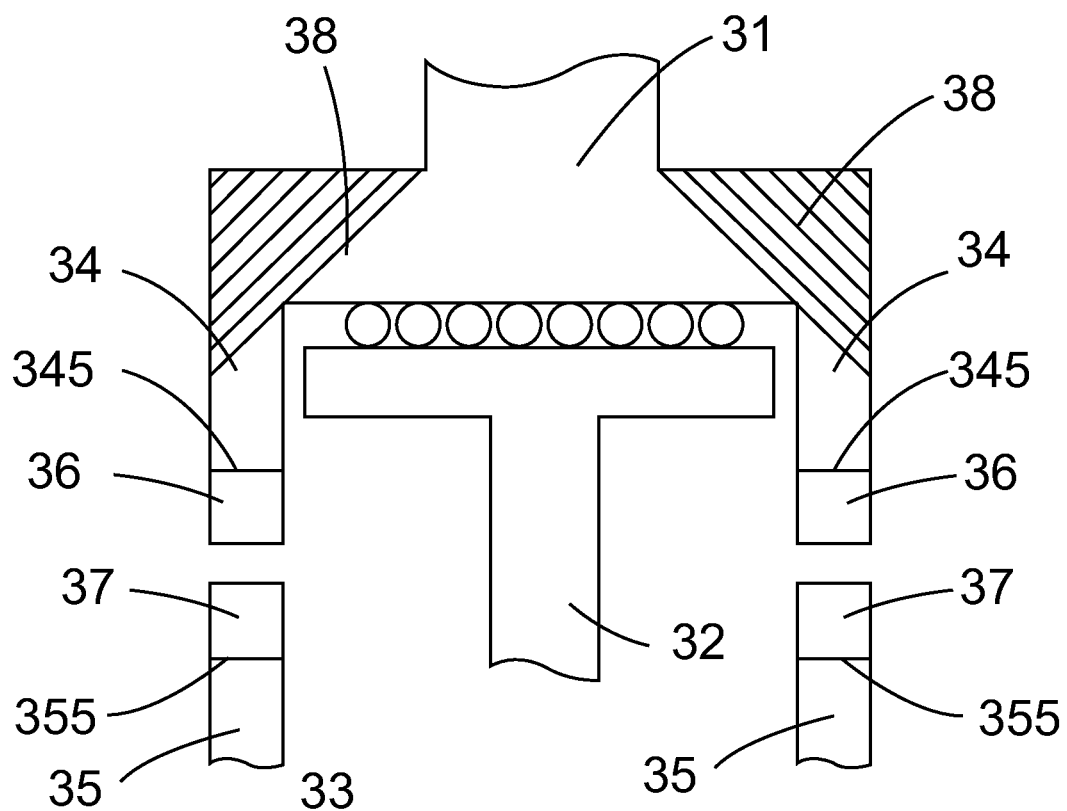
FIG. 3B is a representative cross-section diagram of one preferred embodiments of this invention.
Figure 4:
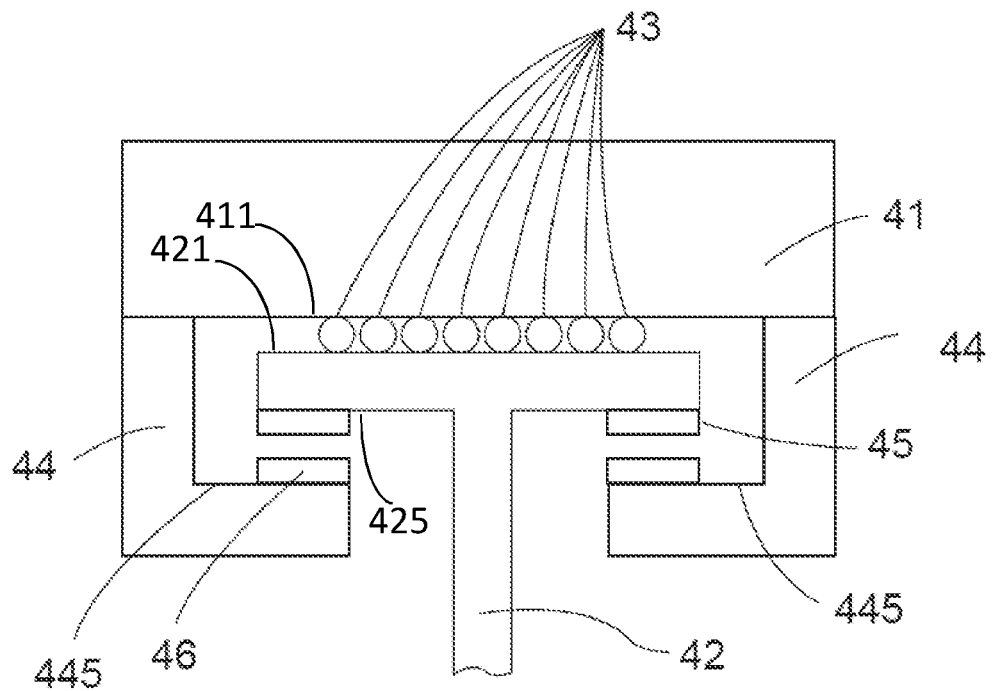
FIG. 4 is a representative cross-section diagram of one preferred embodiments of this invention.

According to comparison between FIG. 4, FIG. 3A and FIG. 3B, the main differences between this embodiment and the previous embodiments are focused on the spatial distribution of magnets 45/46 made of permanent magnet materials, and how the magnetic field action between magnets 45/46 is delivered to the combination of first structure 41, second structure 42 and mechanical bearing(s) 43. In this embodiment, first magnet 45 and second structure 42 are positioned over opposite sides of mechanical bearing 43. Second magnet 46 is positioned close to one side of second structure 42 not facing mechanical bearing 43, but is positioned away one side of first structure 41 facing mechanical bearing 43. Due to the mechanical connection between third structure 44 and first structure 41, third structure 44 will drive first structure 41 close to second structure 42 when the magnetic field action between first magnet 45 and second magnet 46 pushes second magnet 46 on third structure 44 away first magnet 45, i.e., away second structure 42. In this way, the extra force Fa will be parallel to external force Fe, and then induce more serious disadvantages, such as frication and loss. Hence, in this embodiment, the magnetized direction and the magnetized strength of each of the magnets 45/46 are adjusted to bring second magnet 46 close to first magnet 45.

In this embodiment, second structure 42 supports both mechanical bearing 42 and first magnet 45, i.e., second structure 42 corresponds to both second structure 32 and fourth structure 34 in the previous embodiment. Further, second structure 46 and mechanical bearing 43 are positioned over opposite sides of said structure 42 in this embodiment, when second magnet 37 directly faces fourth structure 35 in the previous embodiment. Hence, the configuration of the connection between third structure 44 and second magnet 46 in this embodiment, must be different that the configuration of the connection between third structure 35 and second magnet 37 in the previous embodiment.

Except the above discussions, many characteristics and variations of the embodiment shown on FIG. 4 are similar to that of the previous embodiment shown on FIG. 3A and FIG. 3B. Hence, the detailed discussions are omitted therein.

Another preferred embodiment also is an axial passive magnet bearing system. As shown on FIG. 5, it includes at least first structure 51, second structure 52, at least one mechanical bearing 53, first magnet 54 and second magnet 55. The combination of first structure 51, second structure 45 and mechanical bearings 53 is similar to the well-known mechanical bearing system, hence, the related details are not limited and then not disclosed herein. First magnet 54 is mechanically connected to first surface 515 of first structure 51 and is separated from mechanical bearing 53, where first surface 515 faces mechanical bearing 53. Second magnet 55 is mechanically connected to second surface 525 of second structure 52 and is separated from both mechanical bearing 53 and first magnet 54, where second surface 525 faces mechanical bearing 54. In addition, each of first magnet 54 and second magnet 55 are made of permanent magnet materials, such as hard ferrite magnet, Al—Ni—Co alloy, Sm—Co alloy, Ne—Fe—B alloy, any commercial permanent magnet material, on-developing permanent magnet materials, or any combination thereof.

According to comparison between FIG. 5, FIG. 4, FIG. 3A and FIG. 3B, the main differences between this embodiment and the previous embodiments are focused on the spatial distribution of the permanent magnet material, and how the magnetic field action between the magnets 54/55 are delivered to the combination of first structure 51, second structure 52 and mechanical bearing 53. In this embodiment, the magnets 54/55 made of permanent magnet material(s) are positioned over first structure 51 and second structure 52 separately. Hence, the extra force Fa may be directly generated by the magnetic field action without any device for delivering. In other words, the device for delivering extra force Fa may be directly incorporated into first structure 51 and second structure 52. In such situation, to cancel or even eliminate the extra force Fe, the magnetic field action between first magnet 54 and second magnet 55 expels each other so as to generate the extra force Fa opposite to external force Fe.

As usual, to minimize the loss and/or breakdown of the permanent magnet material(s), first magnet 55 and second magnet 55 does not mechanically contact mechanical bearing 53. For example, both magnets 54/55 surround mechanical bearing 53. However, the embodiment does not limit whether distribution of mechanical bearing overlaps with the distribution of each of first magnet 54 and second magnet 55.

Figure 5:
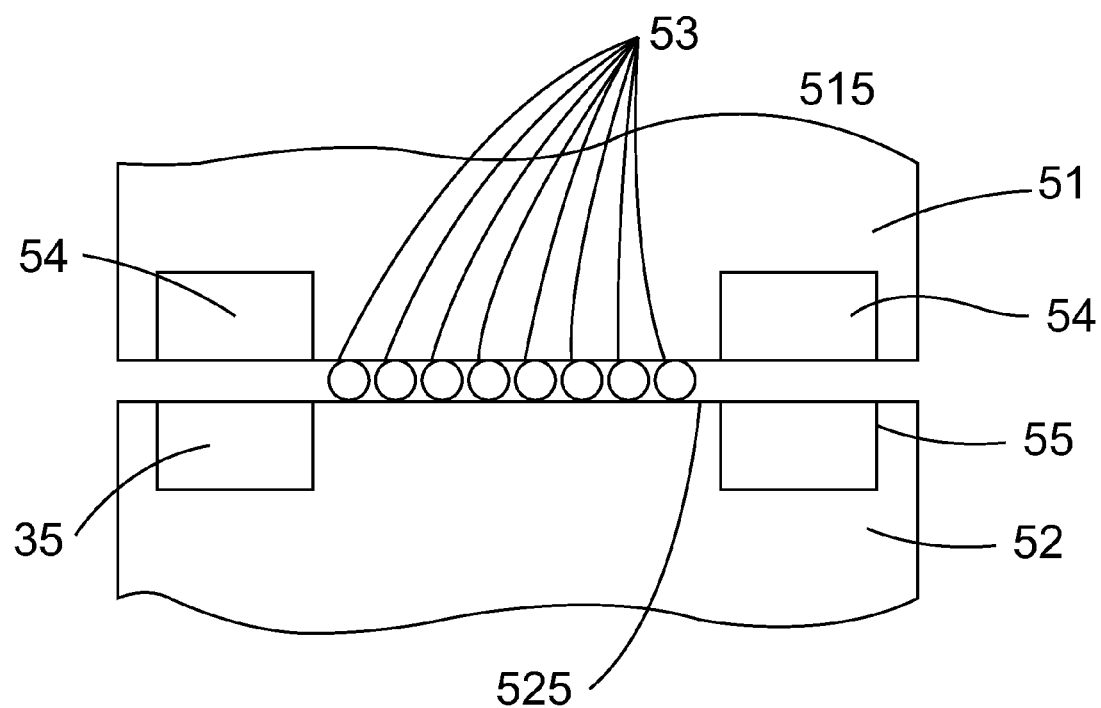
FIG. 5 is a representative cross-section diagram of one preferred embodiments of this invention.

Except the above discussions, many characteristics and variations of the embodiment shown on FIG. 5 are similar to that of the previous embodiment shown on FIG. 3A, FIG. 3B and FIG. 4. Hence, the detailed discussions are omitted therein.

One more preferred embodiment still is an axial passive magnet bearing system. It includes at least first structure, second structure, at least one mechanical bearing, third structure, fourth structure, first magnet and second magnet. The combination of the four structures can be any variation of the previous embodiments. For example, the four structures may be integrated as two structures. In addition, each of first magnet and second magnet is made of permanent magnet materials, such as hard ferrite magnet, Al—Ni—Co alloy, Sm—Co alloy, Ne—Fe—B alloy, any commercial permanent magnet material, on-developing permanent magnet materials, or any combination thereof.

One main characteristic of the embodiment is that whether the magnetized direction of the first magnet is parallel to or opposite to the magnetized direction of the second magnet is decided on whether the spatial order of the first structure and the second structure along an axial direction is parallel to or opposite to the spatial order of the third structure and the fourth structure along this axial direction. By comparing FIG. 3A to FIG. 5, also by referring to the previous discussions about the magnetized direction of the magnet made of permanent magnet material(s), it can be found that the spatial order of the third structure and the fourth structure will decide whether a magnetic attractive force or a magnetic exclude fore is required between the first and the second magnet. When the spatial order between the first and the second magnets along ax axis is equal to the spatial order of the first and the second structure along this axis, a magnetic exclude force is required. In contrast, when the spatial order between the first and the second magnets along ax axis is opposite to the spatial order of the first and the second structure along this axis, a magnetic attractive force is required. Optionally, o a radical plane vertical to the axis, the spatial distribution of the first magnet is equal to the spatial distribution of the second magnet. Herein, the magnetized direction of each magnet can not be vertical to the axial direction, so that these is always non-zero magnetic field action along the axis. But, when the spatial distributions of the magnets are different on the plane vertical to the axes, the minimized requirement is that one magnet has a magnetized direction being not vertical to the axial direction.

Except the above discussions, many characteristics and variations of the embodiment are similar to that of the previous embodiment, and then the detailed discussions are omitted therein.

Note that the above discussions about the limitations on the magnetized directions of the two magnets are based on two assumptions: the external Fe pushes the first structure close to the second structure, and the mechanical connection between the third structure and the first structure ensures that the two structures are moved along same direction along the axis. Hence, whenever any of the assumptions is changed, the limitations on the magnetized direction of both first magnet and second magnet have to be amended accordingly.

Although the present invention has been explained in relation to its preferred embodiments, it is to be understood that other modifications and variation can be made without departing the spirit and scope of the invention as hereafter claimed.

What is claimed is:

1. An axial passive magnet upright bearing system, comprising:
   a first structure, said first structure as a rotor with a first planar;
   a second structure, said second structure as a stator and said second structure being separated from said first structure, wherein said stator with a second planar;
   at least one mechanical bearing, said mechanical bearing being positioned between said first planar and said second planar, wherein said mechanical bearing mechanically contacts both said first planar and said second planar;
   a third structure, said third structure and said first structure being positioned over two opposite sides of said second structure respectively, said third structure being separated from said second structure but being mechanically connected to said first structure;
   a first magnet, said first magnet being mechanically connected to a third planar of said second structure, both said first magnet and said third planar being positioned over one side of said second structure when said mechanical bearing being positioned over one opposite side of second structure; and
   a second magnet, said second magnet being mechanically connected to a fourth planar of said third structure, wherein said fourth planar faces said third planar and said second magnet is separated from said first magnet;
   wherein said first structure, said mechanical bearing, said second structure and said third structure are positioned along an axial direction;
   wherein said first magnet and said second magnet are positioned along the arrangement direction of said first structure, said mechanical bearing and said second structure;
   wherein said first planar, said mechanical bearing, said second planar, said third planar and said fourth planar are parallel, wherein said first planar, said mechanical bearing, said second planar, said third planar and said fourth planar are vertical to the arrangement direction of said first structure, said mechanical bearing and said second structure;
   wherein both said first magnet and said second magnet are made of at least one permanent magnet material.

2. The system as claimed in claim 1, wherein said permanent magnet material is chosen from a group consisting of the following: hard ferrite magnet, Al—Ni—Co alloy, Sm—Co alloy, Ne—Fe—B alloy, or a combination thereof.

3. The system as claimed in claim 1, wherein the magnetized direction of said first magnet is vertical to said first surface, and wherein the magnetic direction of said second magnet is vertical to said second surface.

4. The system as claimed in claim 1, wherein the component of the magnetized direction of said first magnet on said axial direction is opposite to the component of the magnetized direction of said second magnet on said axial direction.

5. The system as claimed in claim 1, said first structure being positioned over said second structure, the magnetized strength of said first magnet and the magnetized strength of said second magnet ensuring that a magnetic attracting force between said second structure and said third structure cancels a gravity force applied by said first structure on both said mechanical bearing and said second structure.

6. The system as claimed in claim 1, the spatial distribution of said first magnet is equal to the spatial distribution of said second magnet.

* * * * *